United States Patent
Frenot et al.

(10) Patent No.: US 11,554,872 B2
(45) Date of Patent: Jan. 17, 2023

(54) JUNCTION OF A PYLON WITH AN AIRCRAFT WING

(71) Applicant: Airbus Operations (S.A.S.), Toulouse (FR)

(72) Inventors: Laurent Frenot, Toulouse (FR); Olivier Pautis, Toulouse (FR); Michael Berjot, Toulouse (FR); Thomas Robiglio, Toulouse (FR); Germain Gueneau, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 23 days.

(21) Appl. No.: 17/386,966

(22) Filed: Jul. 28, 2021

(65) Prior Publication Data

US 2022/0033098 A1    Feb. 3, 2022

(30) Foreign Application Priority Data

Jul. 31, 2020 (FR) ...................................... 2008174

(51) Int. Cl.
*B64D 27/26* (2006.01)
*B64C 3/32* (2006.01)
*B64D 27/18* (2006.01)

(52) U.S. Cl.
CPC ................ *B64D 27/26* (2013.01); *B64C 3/32* (2013.01); *B64D 27/18* (2013.01); *B64D 2027/264* (2013.01)

(58) Field of Classification Search
CPC .. B64D 27/26; B64D 27/18; B64D 2027/264; B64D 27/12; B64D 2027/266; B64C 3/32
See application file for complete search history.

(56) References Cited

U.S. PATENT DOCUMENTS 5,320,307 A * 6/1994 Spofford ................ B64D 27/18
60/797
7,451,947 B2 * 11/2008 Machado ............... B64D 27/12
60/797

(Continued)

FOREIGN PATENT DOCUMENTS

| EP | 2 426 051 A1 | 3/2012 |
| EP | 3 628 594 A1 | 4/2020 |
| FR | 2 909 973 A1 | 6/2008 |

OTHER PUBLICATIONS

French Search Report for Application No. 2008174 dated Apr. 6, 2021.

*Primary Examiner* — Richard Green
*Assistant Examiner* — Steven J Shur
(74) *Attorney, Agent, or Firm* — Jenkins, Wilson, Taylor & Hunt, PA

(57) ABSTRACT

A junction of a pylon with an aircraft wing, the pylon including a primary structure extending from front to rear along a longitudinal axis and in the form of a box with a rear face and an upper spar forming an upper face of the box, a longitudinal median plane separating the primary structure into two parts, left and right, the junction comprising a rear attachment system for attaching the pylon to the wing, this system being arranged at the rear of the primary structure, the rear attachment system including a shoe attached beneath the wing, the shoe being connected, via at least one articulated connecting rod, to a fitting attached to the rear face of the pylon by an articulation whose articulation pin, termed the horizontal articulation pin, is perpendicular to the longitudinal median plane, and the shoe being connected to the upper spar via a force reacting system.

6 Claims, 4 Drawing Sheets

(56) References Cited

U.S. PATENT DOCUMENTS

| | | | |
|---|---|---|---|
| 8,814,079 B2* | 8/2014 | Teulou | B64D 27/26 |
| | | | 244/54 |
| 2010/0147996 A1* | 6/2010 | Hartshorn | B64D 27/18 |
| | | | 244/54 |
| 2011/0259997 A1* | 10/2011 | Marechal | B64D 27/26 |
| | | | 244/54 |
| 2019/0283890 A1 | 9/2019 | Pautis et al. | |
| 2020/0017227 A1 | 1/2020 | DeForet et al. | |

* cited by examiner

JUNCTION OF A PYLON WITH AN AIRCRAFT WING

CROSS-REFERENCE TO RELATED APPLICATION

This application claims priority to French patent application number 20 08174 filed on Jul. 31, 2020, the entire disclosure of which is incorporated by reference herein.

TECHNICAL FIELD

The disclosure herein relates to a junction of a pylon with an aircraft wing.

BACKGROUND

Conventionally, an aircraft comprises at least one jet engine attached beneath each of its wings by a pylon including a primary structure in the form of a rigid box. The pylon is attached isostatically beneath the wing by members for attaching the pylon to the wing. The attachment members include a front attachment system arranged essentially halfway along the length of the primary structure, a rear attachment system arranged at the rear of the primary structure, and an intermediate attachment system arranged between the front and rear attachment systems.

SUMMARY

With reference to FIG. 1, the front attachment system 2a, located on the upper spar 3 of the pylon 1, comprises two pairs of two-point connecting rods 5, arranged on either side of a longitudinal median plane V of the primary structure 4, separating the latter into two parts, left and right. Each two-point connecting rod 5a extends parallel to the longitudinal axis X of the pylon 1 and the two connecting rods 5a of a pair of connecting rods 5 are, on one hand, received between the arms of a three-arm attachment clevis 6 that is secured to the primary structure 4, and are mounted articulated to the clevis via a pin 7 oriented perpendicular to the longitudinal median plane V, and are on the other hand intended to be articulated to the wing (not shown).

The intermediate attachment system 2b, located on the upper spar 3 of the pylon 1, comprises a spigot-type peg 8 which extends in the longitudinal median plane V and is intended to be inserted into a bore provided for that purpose in the wing.

The rear attachment system 2c, also located on the upper spar 3 of the pylon 1, comprises two pairs of three-point connecting rods 10, termed triangular connecting rods. Each triangular connecting rod 10a is essentially in the shape of an isosceles triangle with a through-bore at each corner. Each triangular connecting rod 10 extends perpendicular to the longitudinal median plane V. On each side of this plane, and symmetrically with respect thereto, the two pairs of triangular connecting rods 10 enclose between them an attachment tab 11 that is secured to the primary structure 4, and are articulated thereto by a clevis-type connection with a longitudinally oriented pin 12. Each triangular connecting rod 10a is further designed to be articulated at a point to the wing.

This configuration is satisfactory but involves a significant distance between the wing and the upper spar in order to be able to integrate the rear attachment system. The specific shape of the triangular connecting rods does not make it possible to further reduce this distance.

There is a need to find a design for a rear attachment system that is more compact in order to reduce the bulk of the junction of the pylon with the wing.

One aim of the disclosure herein is to meet all or part of this need. To that end, the disclosure herein relates to a junction of a pylon with an aircraft wing.

A junction of this kind reduces the space required for the rear attachment system.

BRIEF DESCRIPTION OF THE DRAWINGS

The above-mentioned features of the disclosure herein, as well as others, will emerge more clearly upon reading the following description of an exemplary embodiment, the description being provided with reference to the appended drawings, in which.

DETAILED DESCRIPTION

Figure 2:
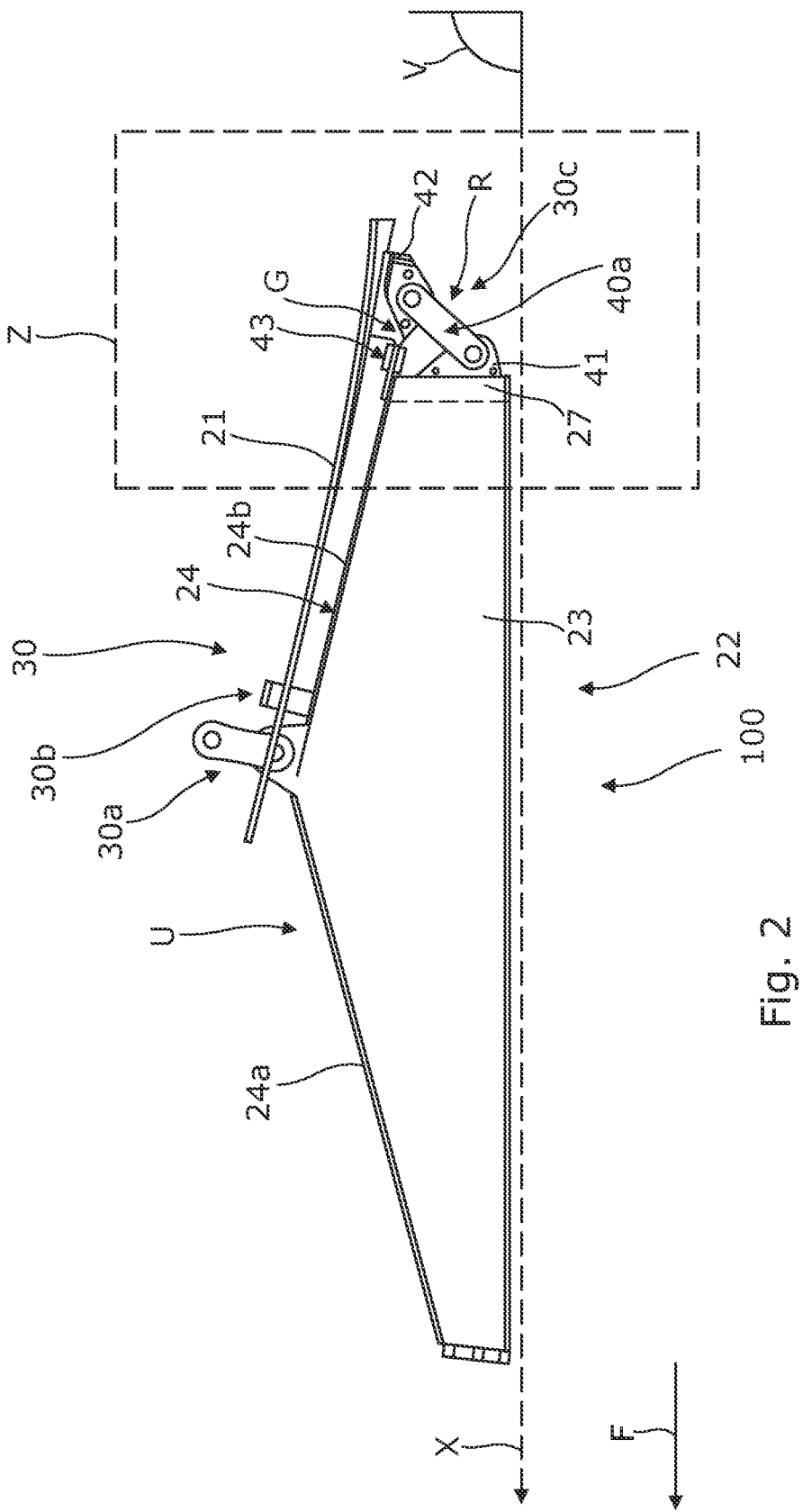
FIG. 2 is a side view of a junction of a pylon with an aircraft wing by members for attaching the pylon to a wing comprising a rear attachment system according to a first embodiment of the disclosure herein.

With reference to FIGS. 2 and 5, a junction 100 of a pylon 22 with a wing 21 of an aircraft is established by attachment members 30. The pylon 22 is attached isostatically beneath the wing 21 and is intended to support a jet engine (not shown) attached beneath the pylon 22.

In the description, the terms relating to a position are considered with reference to the arrow F representing the direction of advance of the wing 21/pylon 22 through the air when acted upon by the thrust provided by the jet engine.

As is known, the pylon 22 comprises a primary structure 23 in the form of a rigid box which extends lengthwise from front to rear along a longitudinal axis X, parallel to the direction of advance F of the aircraft.

The longitudinal median plane V is that plane which is parallel to the longitudinal axis X and is perpendicular to the ground (that is to say to the horizontal) and which divides the primary structure 23 into two parts, left and right.

The primary structure 23 comprises an upper spar 24 which forms the upper face U of the box and which is arranged facing the wing 21 beneath which the pylon 22 is mounted. A rib 27 (shown in transparency in FIG. 2), located at the rear end of the box, extends perpendicular to the longitudinal median plane V and closes the box to form the rear face R thereof.

The attachment members 30 conventionally comprise a front attachment system 30a for attaching the pylon 22 to the wing 21, this system being arranged on the upper face U of the primary structure 23, generally halfway along the latter, a rear attachment system 30c for attaching the pylon 22 to the wing 21, this system being arranged at the rear of the primary structure 23, and an intermediate attachment system 30b for attaching the pylon 22 to the wing 21, this system being arranged on the upper face U between the front and rear attachment systems 30a, 30c.

Figure 1:
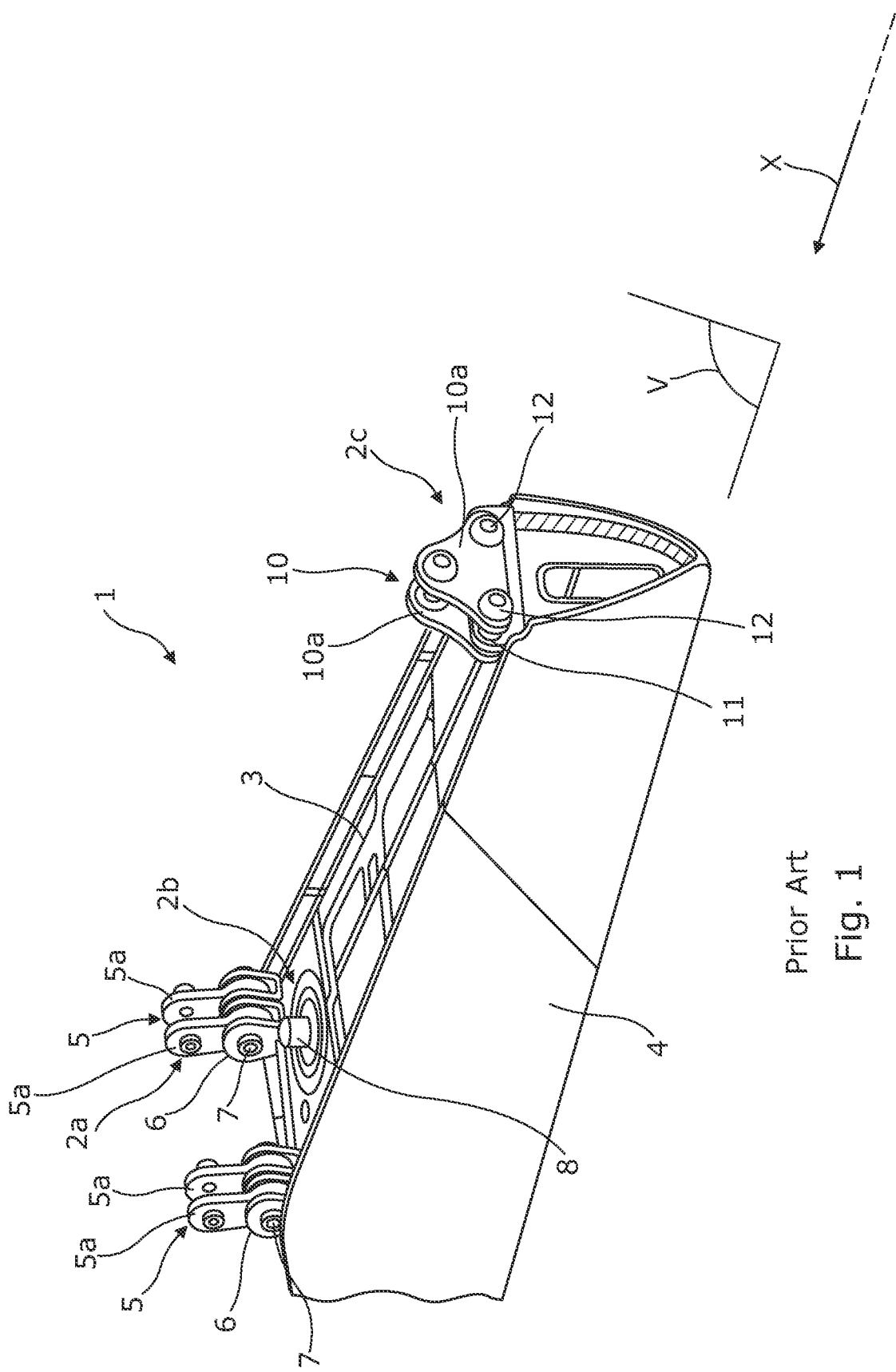
FIG. 1, which has already been described, is a perspective view of the rear of an aircraft pylon with members for attaching the pylon to a wing of the aircraft, according to the prior art.

In the embodiment depicted in FIG. 2, the front attachment system 30a and the intermediate attachment system 30b are of identical design to those of the prior art as described above with reference to FIG. 1, and will not be described further. The front attachment system 30a is provided to react the vertical forces (in the longitudinal median plane V and perpendicular to the longitudinal axis X), whereas the intermediate attachment system 30b is provided to react the transverse forces (perpendicular to the median longitudinal plane V) and the longitudinal forces.

The rear attachment system 30c comprises:
 a fitting 41 attached to the rear face of the pylon R,
 a shoe 42, 142 attached beneath the wing 21, located at the rear of the pylon 22, and connected on one hand, through at least one articulated connecting rod 40a, 140a, to the fitting 41 via an articulation whose articulation pin 45, 145, termed horizontal articulation pin, is perpendicular to the longitudinal median plane V, and connected on the other hand to the upper spar 24c of the pylon 22 via a force reacting system G.

The fitting 41 comprises a planar plate 41a and a planar attachment tab 41b that is attached to the plate 41a and extends perpendicular thereto. The planar plate 41a is attached to the primary structure 23 (more precisely to the rear rib 27), by welding or screwing, and extends within the limits of the box, considering a transverse section of the latter. The planar attachment tab 41b extends towards the rear of the primary structure 23, in the longitudinal median plane V, and comprises a through-bore 41c whose axis is oriented transversely to the longitudinal median plane V. The bore 41c of the attachment tab 41b of the fitting 41 is equipped with a swivel bearing 41d.

Figure 3:
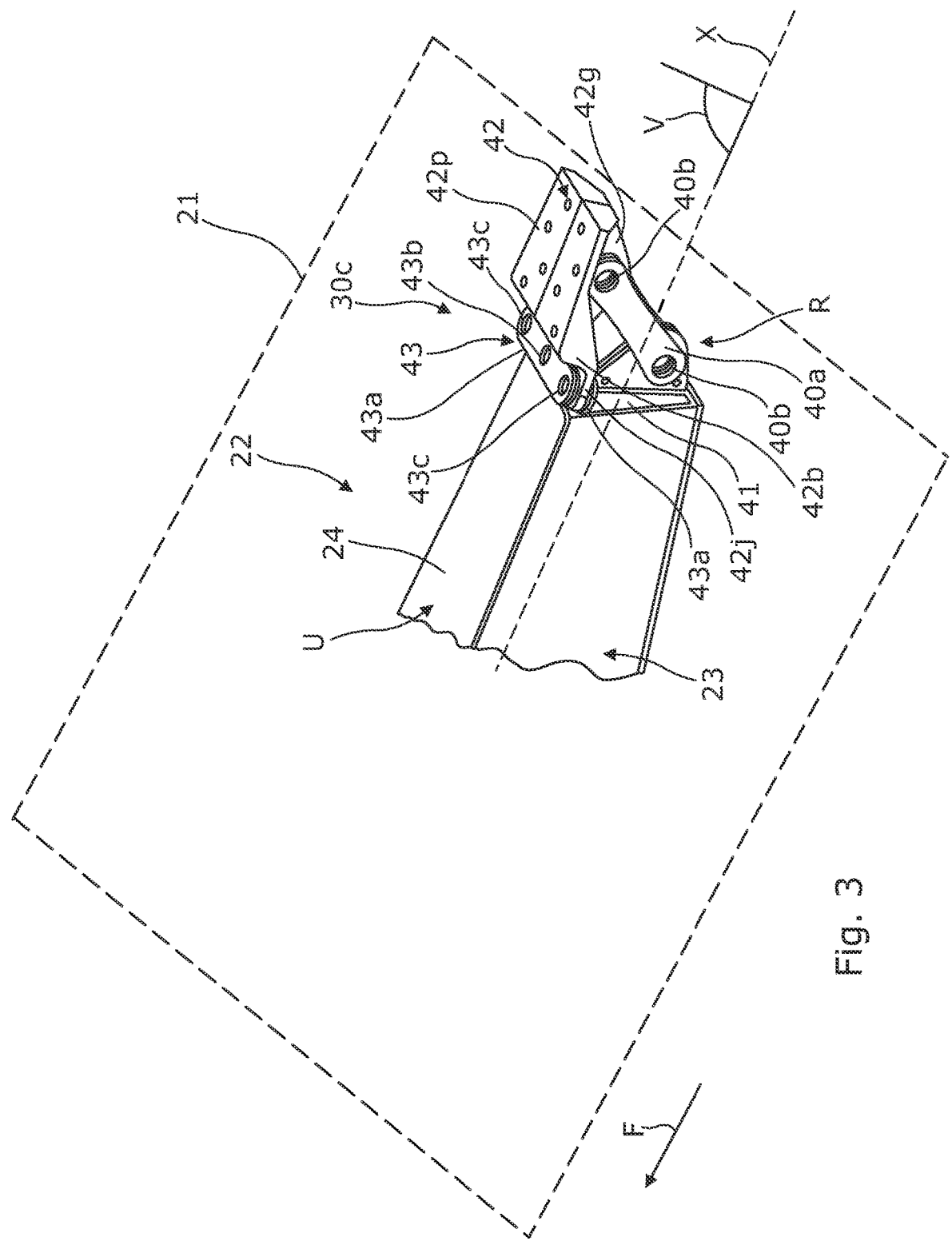
FIG. 3 is a perspective view of the zone Z of FIG. 2, showing in detail the rear attachment system according to the first embodiment of the disclosure herein.
Figure 4:
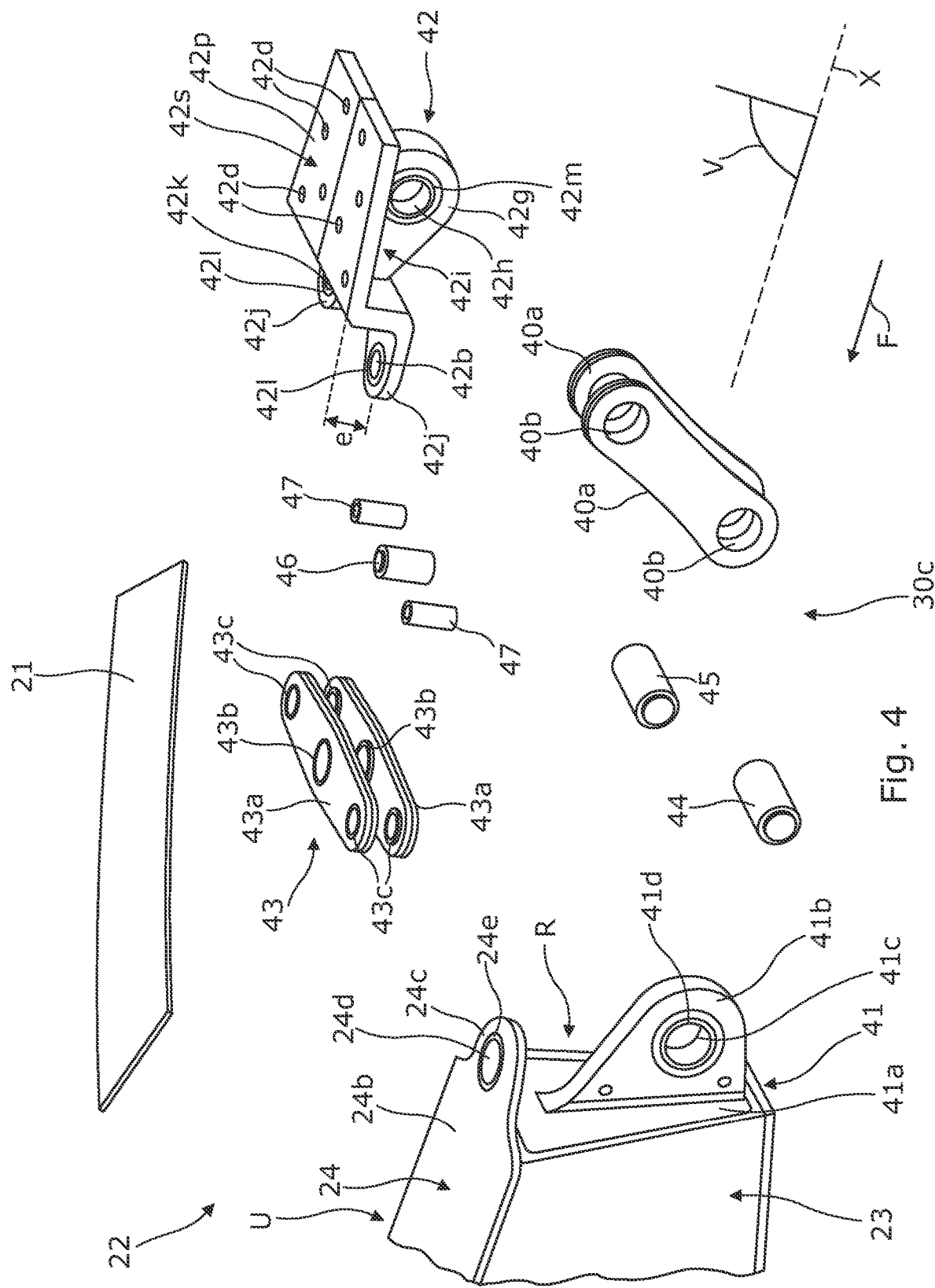
FIG. 4 is an exploded perspective view of the rear attachment system depicted in FIG. 3, according to the first embodiment of the disclosure herein.

According to the disclosure herein, and with reference to FIGS. 2 through 4, the force reacting system G comprises an extension 24c (shown in FIG. 4) that extends the upper spar 24 of the pylon 22 towards the rear, beyond the rear face R of the pylon 22 and spreader 43, the shoe 42 being articulated, through the spreader 43, to the extension 24c via an articulation whose articulation pin 46, termed vertical articulation pin, is parallel to the longitudinal median plane V.

The shoe 42 has a generally S-shaped section when viewed in longitudinal section. The shoe 42 comprises a planar plate 42p which is pressed against the wing 21 and attached beneath the latter and a front portion 42b which is located to the front of the plate 42p and extends downward and perpendicular to a plane of the plate 42p, and on which there are arranged two planar attachment tabs 42j, termed horizontal attachment tabs, that extend towards the front of the shoe 42, and parallel to the plane of the plate 42p.

The plate 42p comprises a planar upper face 42s and a lower face 42i. The plate 42p is attached to the wing 21 at its upper face 42s, which is pressed against the wing 21. In order to attach the plate 42p to the wing 21 (for example to a rib of the wing, or a dedicated fitting which is secured to the structure of the wing), there is arranged on the plate 42p a plurality of through-orifices 42d through which fasteners (for example screws) are to pass, thus attaching the shoe 42 to the wing 21. A planar attachment tab 42g, termed vertical attachment tab, extending perpendicular to the lower face of the plate 42p, is arranged on the lower face 42i of the plate in the median part of the plate 42p (that is to say that the vertical attachment tab 42g extends in the longitudinal median plane V when the shoe 42 is attached beneath the wing 21).

The vertical attachment tab 42g comprises a through-bore 42h whose bore axis is oriented transversely to the median plane V. The through-bore 42h of the vertical attachment tab 42g is equipped with a swivel bearing 42m.

The two horizontal attachment tabs 42j are spaced apart from one another and arranged symmetrically with respect to the longitudinal median plane V. Each of the horizontal attachment tabs 42j comprises a through-bore 42k whose bore axis is perpendicular to the planar upper surface 42s of the plate 42p. The through-bore 42k of each horizontal attachment tab 42j is equipped with a swivel bearing 42l.

The smallest distance e between a horizontal attachment tab 42j of the shoe 42 and the upper face 42s of the plate 42p is identical for each horizontal attachment tab 42j.

The extension 42c of the upper spar is planar and longitudinally extends the upper spar 24 to the rear, beyond the box, that is to say beyond the rear face R of the primary structure 23. The extension 24c comprises a through-bore 24d whose bore axis lies in the longitudinal median plane V and is perpendicular to the plane of the extension 24c. The through-bore 24d is equipped with a swivel bearing 24e.

The extension 24c has a rounded end so as to fit into the space between the two horizontal attachment tabs 42j of the shoe 42.

The spreader 43 consists of or comprises at least one straight three-point connecting rod 43a which comprises three aligned through-bores including one central bore 43b for the vertical articulation pin 46 to pass through, and two end bores 43c on either side of the central bore 43b.

Each connecting rod 40a connecting the shoe 42 to the fitting 41 is a straight two-point connecting rod 40a, with a through-bore 40b at each end of the connecting rod, the connecting rod being mounted articulated at its two ends, on one hand to the fitting 41 and on the other hand to the shoe 42.

In order to ensure redundancy of the load paths in the event of failure (referred to as "fail-safe" logic), and as shown in particular in FIG. 4, the shoe 42 is advantageously connected to the fitting 41 by two identical connecting rods 40a that are arranged on either side of the fitting 41 and of the vertical attachment tab 42g.

The connecting rods 40a are articulated:
 at the fitting 41: by a clevis-type connection with a doubled-up pin 44 that is oriented transversely relative to the longitudinal axis X. The doubled-up pin 44 is snugly fitted into the swivel bearing (not shown) of the attachment tab 41b of the fitting 41 and on either side of this swivel bearing, in a sleeve (not shown) mounted in the through-bore 40b of a two-point connecting rod 40a;
 at the shoe 42: by a clevis-type connection with the horizontal articulation pin 45 oriented transversely relative to the longitudinal axis X. The horizontal articulation pin 45 is snugly fitted into the swivel bearing 42m of the vertical attachment tab 42g of the shoe 42 and on either side of the swivel bearing 42m, in a sleeve (not shown) mounted in the through-bore 40b of a two-point connecting rod 40a. Following the redundancy logic, the horizontal articulation pin 45 is doubled-up.

Thus, the two-point connecting rods 40a are each oriented from bottom to top in a plane parallel to the longitudinal median plane V of the pylon 22, and the assembly comprising the pylon, the pair of two-point connecting rods and the shoe makes it possible to react the vertical forces when the pylon 22 is mounted beneath the wing 21 of the aircraft and supports a jet engine.

The three-point connecting rods 43a of the spreader 43 enclose between them the upper spar 24 on one hand and, on the other hand, the horizontal attachment tabs 42j of the shoe.

The three-point connecting rods 43a of the spreader 43 are attached to the primary structure 22 by a clevis-type connection with the vertical articulation pin 46 oriented vertically, that is to say perpendicular to the longitudinal axis X and parallel to the longitudinal median plane V. The vertical articulation pin 46 is snugly fitted into the swivel bearing 24e of the extension 24c of the upper spar and, on either side of this swivel bearing, in a sleeve (not shown) mounted in the central through-bore 43b of a three-point connecting rod 43a. The three-point connecting rods 43a are oriented approximately horizontally and transversely relative to the longitudinal axis X. Following the redundancy logic, the vertical articulation pin 46 is doubled-up.

The three-point connecting rods 43a are attached to each of the horizontal attachment tabs 42j of the shoe by a clevis-type connection with a vertically oriented pin 47. The pin 47 is snugly fitted into the swivel bearing 42k of the horizontal attachment tab 42j and on either side of this swivel bearing, in a sleeve (not shown) mounted in the end through-bore 43c of a three-point connecting rod.

A pin 47 is mounted without play at a horizontal attachment tab 42j whereas the other pin 47 is mounted with play at the other horizontal attachment tab 42j. The pin 47 mounted with play is a waiting fail-safe pin which will become active in the event of failure of the pin 47 mounted without play.

Thus, the connecting rods 43a of the spreader 43 are each oriented in a plane perpendicular to the longitudinal median plane V, and the assembly comprising the pylon, the spreader and the shoe makes it possible to react the transverse and longitudinal forces when the pylon 22 is mounted beneath the wing 21 of the aircraft and supports a jet engine.

The smallest distance e between a horizontal attachment tab 42j of the shoe 42 and the upper face 42s of the large plate 42a of the shoe is slightly greater than the width (thickness) of the spreader 43 so as to allow the spreader 43, located between the wing 21 and the horizontal attachment tab 42j, to move.

Measurements have made it possible to establish that the maximum distance between the wing 21 and the rear of the pylon 22 could be reduced by half with the rear attachment system 30c according to the disclosure herein. Thus, by virtue of the disclosure herein, the pylon 22 is attached as close as possible to the wing 21. Furthermore, positioning the pair of three-point connecting rods 43 as close as possible to the wing 21 makes it possible to reduce the introduction of secondary moments in the junction.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A junction of a pylon with an aircraft wing, the pylon comprising a primary structure that extends from front to rear along a longitudinal axis and that is in a form of a box with a rear face and an upper spar forming an upper face of the box, a longitudinal median plane separating the primary structure into two parts, left and right, the junction comprising a front attachment system for attaching the pylon to the wing, the front attachment system being on the upper face of the box, halfway along the primary structure, a rear attachment system for attaching the pylon to the wing, the rear attachment system being at the rear of the primary structure, and an intermediate attachment system for attaching the pylon to the wing, the intermediate attachment system being on the upper face of the box between the front and rear attachment systems, the rear attachment system comprising a shoe attached beneath the wing and a fitting attached to the rear face of the pylon, the shoe being connected, via at least one articulated connecting rod, to the fitting by an articulation with a horizontal articulation pin perpendicular to the longitudinal median plane, the shoe being connected to the upper spar via a force reacting system, wherein the force reacting system comprises an extension extending the upper spar of the pylon towards the rear and a spreader, the shoe being articulated, through the spreader, to the extension via an articulation with a vertical articulation pin parallel to the longitudinal median plane.

2. The junction according to claim 1, wherein the extension comprises a through-bore equipped with a swivel bearing, and wherein the vertical articulation pin is mounted in the swivel bearing.

3. The junction according to claim 1, wherein the shoe has a generally S-shaped section and comprises a planar plate attached to the wing and a front portion which is located to the front of the plate and extends perpendicular to a plane of the plate, and on which there are two planar attachment tabs that are horizontal attachment tabs and that are arranged on either side of the longitudinal median plane and that extend towards the front of the shoe, and parallel to the plane of the plate, each horizontal attachment tab comprising a through-orifice equipped with a swivel bearing.

4. The junction according to claim 3, wherein the spreader comprises at least one connecting rod, each connecting rod comprising three through-bores including one central bore receiving the vertical articulation pin, and two end bores on either side of the central bore, each end bore receiving an articulation pin mounted in the swivel bearing associated with a horizontal attachment tab.

5. The junction according to claim 4, wherein, in case of one horizontal attachment tab, the articulation pin is mounted with play in an associated swivel bearing, whereas in case of another horizontal attachment tab, the articulation pin is mounted without play in the associated swivel bearing.

6. The junction according to claim 3, wherein the plate comprises a planar upper face that is pressed against the wing and a lower face, and wherein a planar attachment tab that is a vertical attachment tab is on the lower face of the plate and extends in the longitudinal median plane, the vertical attachment tab comprising a through-orifice equipped with a swivel bearing in which the horizontal articulation pin is mounted.

* * * * *